(12) United States Patent
Osaki

(10) Patent No.: US 12,277,337 B1
(45) Date of Patent: Apr. 15, 2025

(54) AUTOMATIC STORAGE CONFIGURATION SYSTEM

(71) Applicant: HITACHI, Ltd., Tokyo (JP)

(72) Inventor: Hiroyuki Osaki, Los Gatos, CA (US)

(73) Assignee: HITACHI, Ltd., Tokyo (JP)

( * ) Notice: Subject to any disclaimer, the term of this patent is extended or adjusted under 35 U.S.C. 154(b) by 0 days.

(21) Appl. No.: 18/522,345

(22) Filed: Nov. 29, 2023

(51) Int. Cl.
*G06F 3/06* (2006.01)

(52) U.S. Cl.
CPC ............ *G06F 3/065* (2013.01); *G06F 3/0604* (2013.01); *G06F 3/0665* (2013.01); *G06F 3/0679* (2013.01)

(58) Field of Classification Search
CPC ...... G06F 3/065; G06F 3/0604; G06F 3/0665; G06F 3/0679
USPC .................................................. 711/154, 161
See application file for complete search history.

(56) References Cited

U.S. PATENT DOCUMENTS

| | | | |
|---|---|---|---|
| 10,116,510 B2 | 10/2018 | Burk et al. | |
| 2017/0032020 A1* | 2/2017 | Burk ....................... | H04L 41/20 |
| 2017/0083251 A1 | 3/2017 | Karake et al. | |
| 2020/0097177 A1* | 3/2020 | Ashokkumar .......... | G06F 3/065 |
| 2020/0236121 A1* | 7/2020 | Spurlock ................ | G06F 21/566 |
| 2022/0147253 A1* | 5/2022 | Sajeepa ................... | G06F 3/065 |
| 2022/0365721 A1* | 11/2022 | Pabón ..................... | G06F 3/067 |
| 2022/0382455 A1* | 12/2022 | Lee ........................ | G06F 3/0604 |
| 2023/0205638 A1* | 6/2023 | Du ........................ | G06F 11/1448 |
| | | | 707/654 |
| 2023/0236755 A1* | 7/2023 | Kulkarni ................ | G06F 3/067 |
| | | | 711/114 |

* cited by examiner

*Primary Examiner* — Than Nguyen
(74) *Attorney, Agent, or Firm* — Procopio, Cory, Hargreaves & Savitch LLP

(57) ABSTRACT

Systems and methods described herein can involve for receipt of an addition or modification of a storage device, executing a validation process from one or more managed validation kits according to a remote copy function associated with the storage device, the one or more managed validation kits selected according to one or more feature types associated with the remote copy function; associating the storage device with a corresponding group of storage devices associated with the remote copy function based on information provided by the one or more managed validation kits; and for the association of the storage device with the corresponding group of storage devices and the execution of the validation process being successful, registering the storage device to a storage class associated with the remote copy function.

18 Claims, 17 Drawing Sheets

Storage class device list 211-1

| Storage class 211-1-1 | Storage device names 211-1-2 |
|---|---|
| StorageClass1 | Sb, Sc, Sd, Se |
| StorageClass2 | Sc, Sf, Sg |
| StorageClass3 | Sh, Si |

FIG. 5

Storage class - feature table 211-2

| Storage 211-2-1 | Required feature type 211-2-2 | Feature subtype 211-2-3 | Feature Validation Kit Name 212-2-4 |
|---|---|---|---|
| StorageClass1 | Backup | BackupWithS3 | BackupKit1 |
|  |  | BackupWithAzureBlob | BackupKit2 |
| StorageClass2 | SyncReplication |  | GADKit1 |
| StorageClass3 | AsyncReplication |  | URKit1 |

FIG. 6

Feature validation kit table 211-3

| Feature Validation Kit Name 211-3-1 | API address 211-3-2 | Control storage device 211-3-3 | Validation kit status 211-3-4 |
|---|---|---|---|
| BackupKit1 | API address: X.X.X.X | Sb | Good |
| BackupKit2 | API address: x.x.x.x | Any | Good |
| GADKit1 | Coordinator IP: X.X.X.X | Sc | Not Good |
| URKit1 | IP: X.X.X.X | Sh | Pending |

FIG. 7

Feature validation script table 211-4

| Feature type/subtype 211-4-1 | Feature validation script 211-4-2 |
|---|---|
| BackupWithS3 | BackupValidationScript1 |
| BackupWithAzureBlob | BackupValidationScript2 |
| SyncReplication | SyncReplicationScript1 |
| AsyncReplication | AsyncReplicationScript1 |
| QuickCloneInAZ | CloneScript1 |

FIG. 8

Storage device list 211-5

| Storage device 211-5-1 | Parameters 211-5-2 | Feature 211-5-3 | Feature validation result 211-5-4 | | | Latest validation time 211-5-5 |
|---|---|---|---|---|---|---|
| | | | Status 211-5-4-1 | Throughput 211-5-4-2 | Lag time 211-5-4-3 | |
| Sa | IP address Y.Y.Y.Y | CloudBackup | Good | 350 MB/s | 10s | 2023/02/01 19:53:12 |
| | | BackupWithS3 | Good | 350 MB/s | 10s | 2023/02/01 19:53:12 |
| | | BackupWithAzureBlob | Not Good | | | 2023/02/01 19:50:25 |
| | | SyncReplication | Pending | | | 2023/02/01 19:00:00 |
| Sb | IP address Z.Z.Z.Z | BackupWithS3 | Good | 500 MB/s | 10s | 2023/02/01 19:53:12 |
| | | BackupWithAzureBlob | Good | 1 GB/s | 20s | 2023/02/01 19:40:00 |
| Sc | IP address A.A.A.A | SyncReplication | Pending | | | 2023/02/01 19:03:00 |
| | | AsyncReplication | Good | 2 GB/s | 1s | 2023/02/01 19:07:00 |
| | | QuickCloneInAz | Good | 10 GB/s | 10ms | 2023/02/01 19:10:00 |

FIG. 9

Feature status decision table 211-6

| Output type 211-6-1 | Input patterns 211-6-2 | | | |
|---|---|---|---|---|
| | Pattern1 Target: Good Control: Good 211-6-2-1 | Pattern2 Target: Not Good Control: Not Good 211-6-2-2 | Pattern3 Target: Not Good Control: Good 211-6-2-3 | Pattern4(option) Target: Not Good Control: Not Good 211-6-2-4 |
| Feature validation result | Good | Pending | Not Good | Pending Retry interval: 5min |
| Validation kit status | Good | Not Good | Good | Pending Retry interval: 5min |

FIG. 10

Feature validation result history table 211-7

| Storage device 211-7-1 | Feature validation kit 211-7-2 | Validation kit result 211-7-3 | | | Latest validation time 211-7-4 |
|---|---|---|---|---|---|
| | | Status 211-5-4-1 | Throughput 211-5-4-2 | Lag time 211-5-4-3 | |
| Sa | BackupKit1 | Good | 350 MB/s | 10s | 2023/02/01 19:53:12 |
| Sb | BackupKit1 | Good | 1 GB/s | 10s | 2023/02/01 19:53:12 |
| Sa | BackupKit2 | Not Good | | | 2023/02/01 19:50:25 |
| Sb | BackupKit2 | Good | 2 GB/s | 20s | 2023/02/01 19:40:00 |
| Sc | GADKit1 | Not Good | | | 2023/02/01 19:03:00 |
| Sa | GADKit1 | Not Good | | | 2023/02/01 19:00:00 |

FIG. 11

Feature validation script 211-8

```
Name: BackupValidationScript1
Operations:
- operationId: 1
  target: {IP address}
  request: create_backup_job
  parameters:
       targetVolume: {volume name}
       destinationStorageDevice: s3://bucket_name
- operationId: 2
  target: s3://bucket_name
  request: check_backup_file_exists
  returnValue: boolean
- operationID: 3
  operation: |
       if(returnValue)==true: return "Good"
       else: return "Not good"
```

FIG. 14

Data provisioning request

Name: ApplicationSecretData1

Storage class: StorageClass1

Profile
    Supported features:
    - Backup (Backup with S3 or backup with Azure Blob Store)
    Total number of classified storage devices: 5

Required size: 1TB

FIG. 21

AUTOMATIC STORAGE CONFIGURATION SYSTEM

BACKGROUND

The present disclosure is generally directed to information technology (IT) systems which can involve storage devices and applications, and more specifically, towards an automatic storage configuration system for IT systems.

RELATED ART

FIG. 1 illustrates an example of the related art storage device management.

Storage devices not only store data, but also copy the data to other devices using backup features and disaster recovery features. However, the capabilities of such storage devices are not homogeneous. Some storage devices have the features, but other devices do not have it. This depends on different storage device models, activation status of feature licenses, or proper configurations of the storage device.

Storage device features such as backup and disaster recovery features require external components. Examples of external devices are the destination storage device and the coordination server. These features copies data from an original storage device to another destination storage device. Therefore, these features need a destination storage device which receives a copy of the data. Sometimes, these features need a coordinator server to manage the copy operation between the storage devices. For example, the backup feature executes a copy operation of the user's volume to other storage devices at some point, and the copy operation repeats periodically. The coordinator server controls how frequently the operation repeats and where the copy data should be stored.

Storage management system is a centralized system that connects to many storage devices. The storage management system collects information such as device model information, feature license information and performance metrics from the storage devices and configure the devices. From using this information, the storage management system can know which features are enabled in storage devices.

Nowadays, remote backup/disaster recovery features are delivered to users through the storage management system. Users send a request of storage device features. First, the storage management system provisions the storage capacity to allocate user data. After the provisioning, the data provisioned in the storage device will be protected by remote backup/disaster recovery features.

However, the storage management system cannot decide which storage device can provide the features. This is because the storage management system does not manage external components which are needed for remote backup/replication features. Correctly determining the device which offers remote backup/disaster recovery features can be more difficult than other features because of this factor. For example, the remote backup feature may be activated only with the coordinator server. In order to check if the feature works correctly, it is needed to start a backup operation and to validate the operation result with these external components. If the storage management system allocates the user's request devices having the wrong configuration, the features may fail when the destination storage device is missing or when the coordinator server stops to work.

SUMMARY

Example implementations described herein address the above storage management issue and aims at increasing user satisfaction by allocating the correct devices to user requests.

In order to satisfy the user request, the storage management system should determine storage devices that support remote backup/disaster recovery features in response to the user request.

However, the storage management system cannot determine the storage device supporting remote backup or disaster recovery features. The first reason is that the target storage device itself cannot check if the feature works correctly. These features must be checked using external components such as multiple storage devices and coordinator servers. However, the storage management system does not manage external components.

Another reason is the fact that such external components are managed in a different lifecycle from target storage devices. The external components are prepared manually by operators other than storage device owners. This preparation happens at a different timing from when the storage management system or storage devices are prepared. It is because the target storage device does not have ability to control external components directly.

Another reason is that the external components may fail due to many situations happening outside of the target storage devices.

Related art implementations can involve methods to check the quality of devices using information fetched from devices themselves. However, such related art implementations do not address the above issue around the external components, and this leads to being unable to satisfy the user request.

Example implementations described herein satisfy the user request by guaranteeing that the storage devices support the requested feature. For this purpose, the example implementations described herein introduce a feature validation process which automates the validation of storage devices features prior to the user request. After the feature validation, the example implementations described herein confirm that a target storage device has the feature. Moreover, the example implementations described herein automatically classifies the storage device based on the feature validation result. Storage devices are classified into "storage classes" which guarantees that the remote backup/replication feature works correctly. Users can use the correct storage devices which supports the user request for required features.

The example implementations described herein also enable to manage external components as reusable groups known as "validation kits".

The example implementations also enable operators to register external components in a different lifecycle from the storage device. To facilitate such implementations, the example implementations involve separate modules such as a validation kit management module and storage device discovery module.

Aspects of the present disclosure can involve a method, which can involve, for receipt of an addition or modification of a storage device, executing a validation process from one or more managed validation kits according to a remote copy function associated with the storage device, the one or more managed validation kits selected according to one or more feature types associated with the remote copy function; associating the storage device with a corresponding group of storage devices associated with the remote copy function based on information provided by the one or more managed validation kits; and for the association of the storage device with the corresponding group of storage devices and the execution of the validation process being successful, registering the storage device to a storage class associated with the remote copy function.

Aspects of the present disclosure can involve a system which can involve, for receipt of an addition or modification of a storage device, means for executing a validation process from one or more managed validation kits according to a remote copy function associated with the storage device, the one or more managed validation kits selected according to one or more feature types associated with the remote copy function; means for associating the storage device with a corresponding group of storage devices associated with the remote copy function based on information provided by the one or more managed validation kits; and for the association of the storage device with the corresponding group of storage devices and the execution of the validation process being successful, means for registering the storage device to a storage class associated with the remote copy function.

Aspects of the present disclosure can involve a computer program, which can include, for receipt of an addition or modification of a storage device, executing a validation process from one or more managed validation kits according to a remote copy function associated with the storage device, the one or more managed validation kits selected according to one or more feature types associated with the remote copy function; associating the storage device with a corresponding group of storage devices associated with the remote copy function based on information provided by the one or more managed validation kits; and for the association of the storage device with the corresponding group of storage devices and the execution of the validation process being successful, registering the storage device to a storage class associated with the remote copy function. The computer program and instructions can be stored on a non-transitory computer readable medium and executed by one or more processors.

Aspects of the present disclosure can involve an apparatus, which can include, a processor, configured to, for receipt of an addition or modification of a storage device, execute a validation process from one or more managed validation kits according to a remote copy function associated with the storage device, the one or more managed validation kits selected according to one or more feature types associated with the remote copy function; associate the storage device with a corresponding group of storage devices associated with the remote copy function based on information provided by the one or more managed validation kits; and for the association of the storage device with the corresponding group of storage devices and the execution of the validation process being successful, register the storage device to a storage class associated with the remote copy function.

BRIEF DESCRIPTION OF DRAWINGS

FIG. 5 illustrates the storage class device list, in accordance with an example implementation.

FIG. 6 illustrates the storage class—feature table, in accordance with an example implementation.

FIG. 7 illustrates the feature validation kit table, in accordance with an example implementation.

FIG. 8 illustrates the feature validation script table, in accordance with an example implementation.

FIG. 9 illustrates the storage device list, in accordance with an example implementation.

FIG. 10 illustrates the feature status decision table, in accordance with an example implementation.

FIG. 11 illustrates the feature validation result history table, in accordance with an example implementation.

FIG. 14 illustrates the feature validation script, in accordance with an example implementation.

FIG. 21 illustrates the data request program example, in accordance with an example implementation.

DETAILED DESCRIPTION

Figure 1:
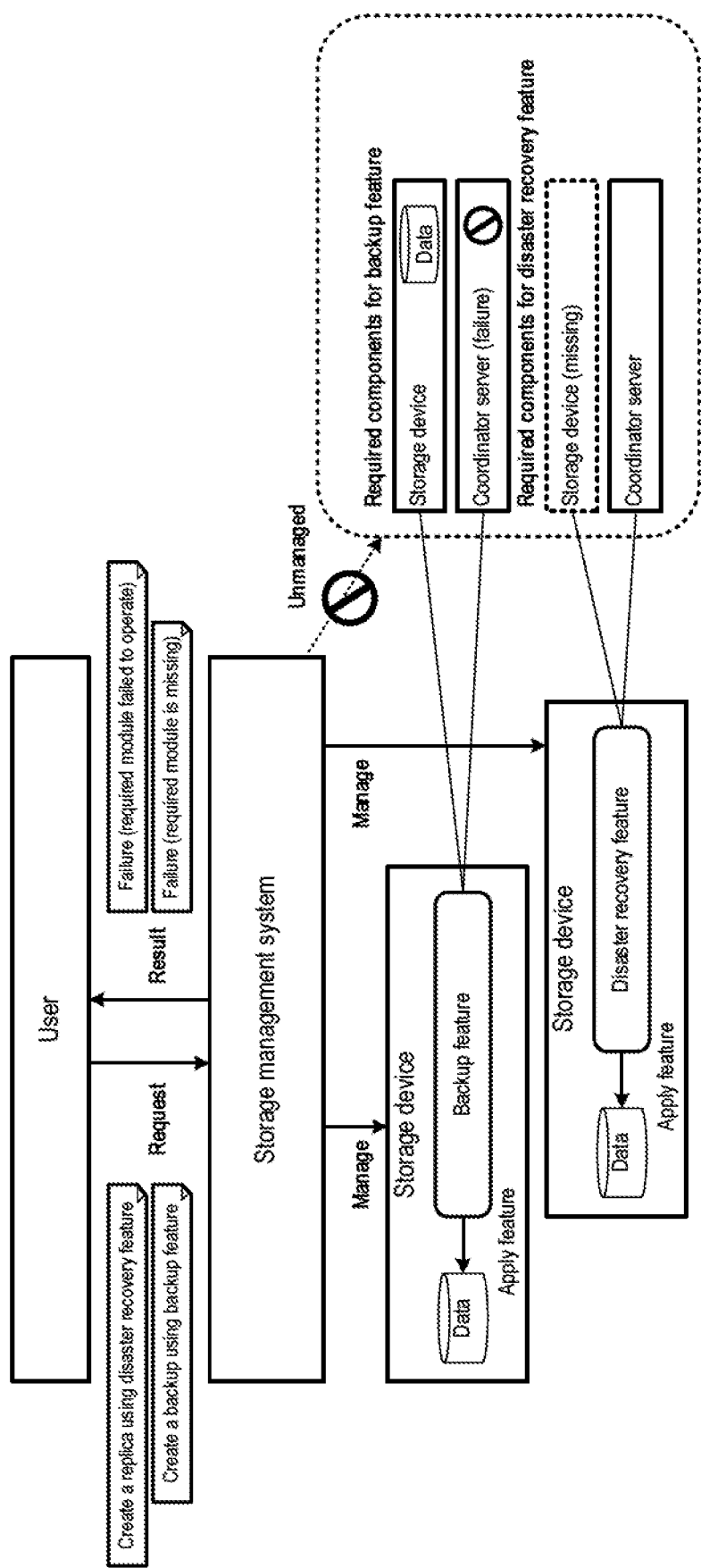
FIG. 1 illustrates the storage management issue.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination, and the functionality of the example implementations can be implemented through any means according to the desired implementations.

In the following description the storage configuration system implementation overview is explained. Further, the feature validation process and validation kit selfcheck process which the storage configuration system executes are explained. The feature validation process automates detection of storage device and validation regarding whether the features correctly work. The information used for the concepts will also be described, as well as the storage device classification process.

Figure 2:
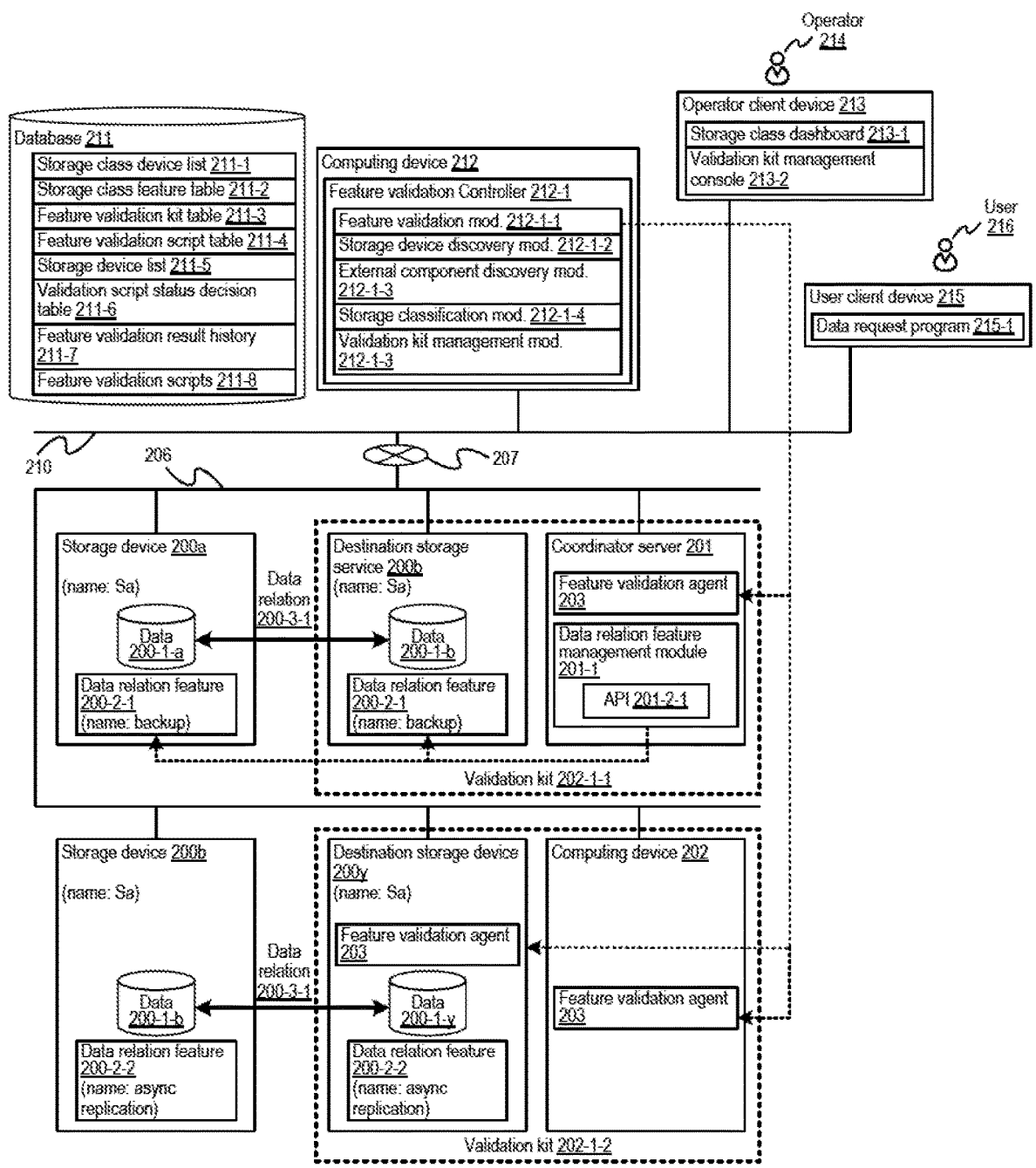
FIG. 2 illustrates the storage configuration system overview, in accordance with an example implementation.

FIG. 2 shows a component diagram of the storage configuration system implementation, in accordance with an example implementation. The system has managed devices such as storage devices 200, coordinator servers 201, and computing devices 202 and management services such as database 211, computing devices 212, and operator client devices 213.

Managed Devices

Storage devices 200 contains user data 200-1, network ports 200-2 and data relation feature application programming interface (API) 200-3. User data is a storage volume or file to store user information. Storage device 200 communicates with other devices such as coordinator server 201 or other storage devices 200b.

Coordinator server 201 is a network-connecting service which communicates one or more storage devices 200 and remotely controls these devices using data relation feature API 200-3. Coordinator server 201 also contains network port 201-1, data relation feature management module 201-2 and feature validation agent 203.

Computing device 202 is a network-connecting device which can execute feature validation agent solely.

All components of storage devices 200, coordinator server 201, and computing device 202 connect to one or more interconnect network 206 and communicate with each other.

In storage device 200, coordinator server 201 or computing device 202, feature validation agent 203 is a ubiquitous module located in any components such as storage device 200, coordinator server 201 or computing device 202. Feature validation agents 203 communicate with feature validation controller 212-1 and works for feature validation.

Management Services

Database 211 contains information required for processes of the feature validation controller 212-1, which includes storage class device list 211-1, storage class feature table 211-2, feature validation kit table 211-3, feature validation script table 211-4, storage device list 211-5, validation script result decision table 211-6, feature validation result history table 211-7, and feature validation scripts 211-8. The details of this information are described with respect to FIG. 5 to FIG. 11.

Feature validation controller 212-1 contains modules such as feature validation module 212-1-1, storage device discovery module 212-1-2, external component discovery module 212-1-3, storage classification module 212-14, and validation kit management module 212-1-5.

Feature validation module 212-1-1 executes feature validation scripts and get feature validation result. This result is used by storage classification module 212-14. The details are described in the "Feature validation" section.

Storage device discovery module 212-1-2 detects the operator storage addition operation. The detected event is notified to feature validation module 212-1-1.

External component discovery module 212-1-3 detects other components such as events when coordination server 201 or computing device 202 is added. The events are notified to feature validation module 212-1-1 as well.

Storage classification module 212-14 executes storage classification process to determine which storage class a new storage device belongs to. The process detail is described in "Storage classification process" section later.

Validation kit management module 212-1-5 manages various validation kits which are used by feature validation module 212-1-1. For example, validation kit management module can add a new validation kit or delete existing validation kits.

Others

The system is used by users 216 who has computing device 215 and operator 214 who has operator client device 213. Use 205 uses data request program 215-1. Operator 214 uses storage class dashboard 213-1 and validation kit management console 213-2 in computing device 213 to view all results which feature validation controller 212-1.

Storage Device Features and Data Relations

Storage device features such as remote backup or replication create data relations. A data relation contains one or more data 200-1 and defines the relationship between these data. For example, data 200-1-a in storage device 200a data 200-1-b in storage device 200b have a data relation. Data relation 200-4 can be various types such as remote backup, replication, snapshot or others. Data relation 200-4 can be unidirectional relationship. For example, data 200-1-a can be a parent of data 200-1-b which means that contents of data 200-1-a will be copied to data 200-1-b. In other cases, the data relation 200-4 can be bi-directional. Data relation feature API 200-3 is used for controlling the data relations 200-4. Other components in the same network with storage device 200 and connecting with network port 200-2 can call the data relation feature API 200-3 to start or stop data relations or to execute some specific operation such as "RESYNCHRONIZATION" in replication feature.

Storage device 200 controls data relation 200-4 which defines relationship between multiple data in multiple storage devices 200.

Feature Validation

Figure 3:
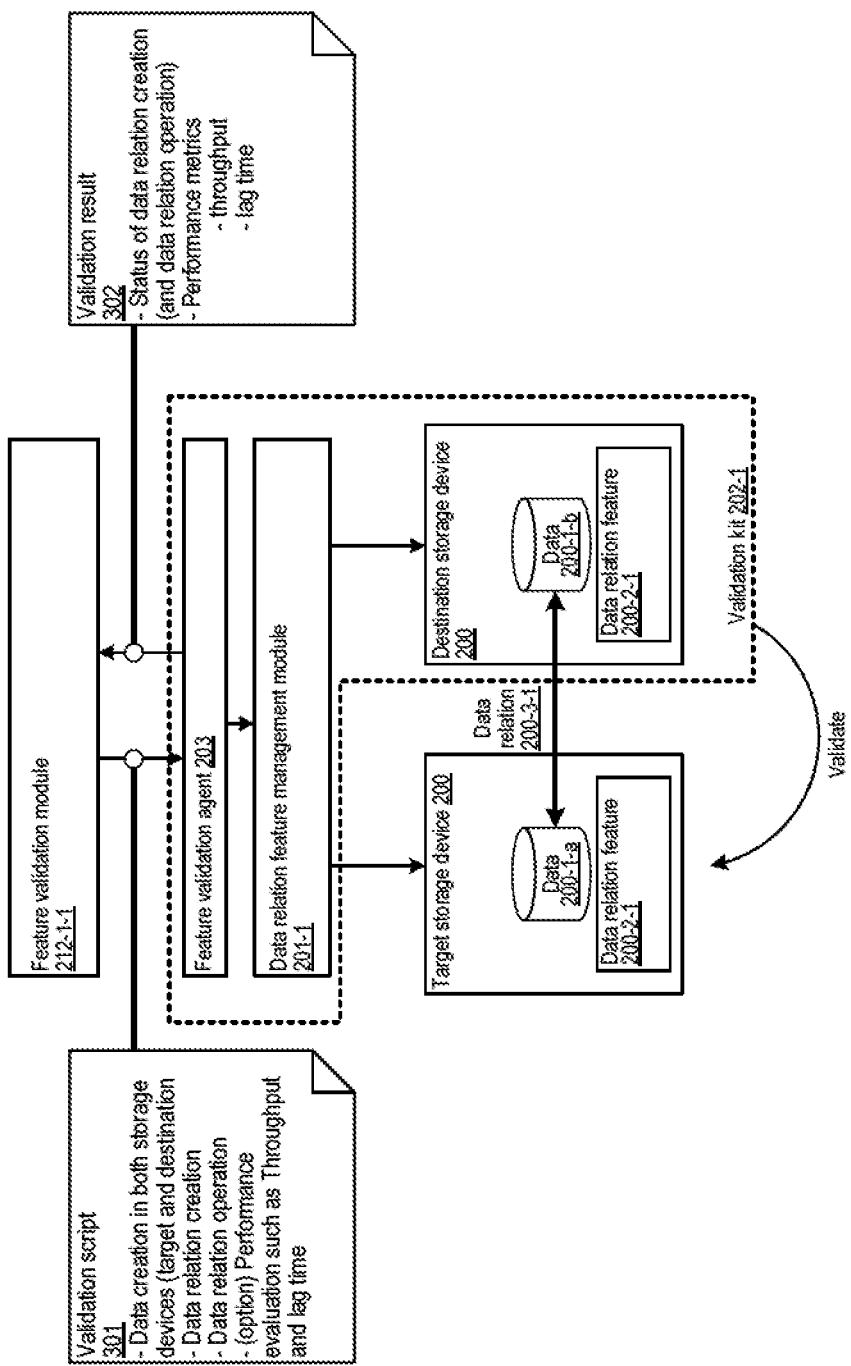
FIG. 3 illustrates the feature validation with validation kit and feature validation module.

Feature validation process is a main function of the storage configuration system. The purpose of feature validation process is to automatically check features of a newly added storage device or existing storage device. The process can be executed at the timing of storage addition events or it can be executed at regular intervals such as 1 day or 1 week. Validation kit 202-1 and feature validation module 212-1-1 are used for the process. This FIG. 3 shows setup of validation kit and feature validation module. two modules collaboratively check data relation features in new added storage device or other devices.

Each validation kit 201-1 is set up for validation of one data relation feature. For example, a validation kit is prepared for validating "remote backup" feature and another validation kit is prepared for validating "replication" feature. These validation kits are managed by validation kit management module 212-1-5 and feature validation kit table 211-3.

Feature validation module 212-1 uses various validation kits depending on which feature needs to be checked in feature validation process. feature validation module 212-1-1 communicates with a specific validation kit using the internet protocol (IP) address. Feature validation agent 203 in the validation kit receives the request and commands required validation operations described in validation scripts 301 to data relation feature management module 201-1. Data relation feature management module asks both storage devices to turn on data relation feature inside each device. Data relation feature creates data relation 200-3. Optionally, data relation feature executes other operations which is specific for the created data relation such as "RESYNCHRONIZATION" in replication feature. Feature validation agent 203 can execute other operations such as performance evaluation such as throughput and lag time in itself if the operation is described in validation script. This performance evaluation is done by mocking data access from the computing device to data in the target and the destination storage device. When the mocked data access starts, storage devices process data access Input/Output (IO) commands and it results in overhead in storage devices and network between devices. After some time has passed for the data access, feature validation agent 203 can calculate throughput and lag time from evaluated metrics such as how long the data access execution time has elapsed.

Feature validation module 212-1 gets a validation result from the validation kit after execution of the validation. Validation results 302 contain various information according to validation execution, such as status of data relation creation, performance metrics, and so on. For example, the status of data relation creation/operation may be Boolean information described as "good" or "not good". Performance metrics may be throughput described in a manner such as "350 MB/s" and lag time described in a manner such as "20 ms".

Validation kits are prepared by operator 214 or automatically prepared by external component discovery module 212-1-3. After preparation, the validation kits are registered to validation kit management module 212-1-5 via validation kit management console 213-2.

Validation Kit Selfcheck

Figure 4:
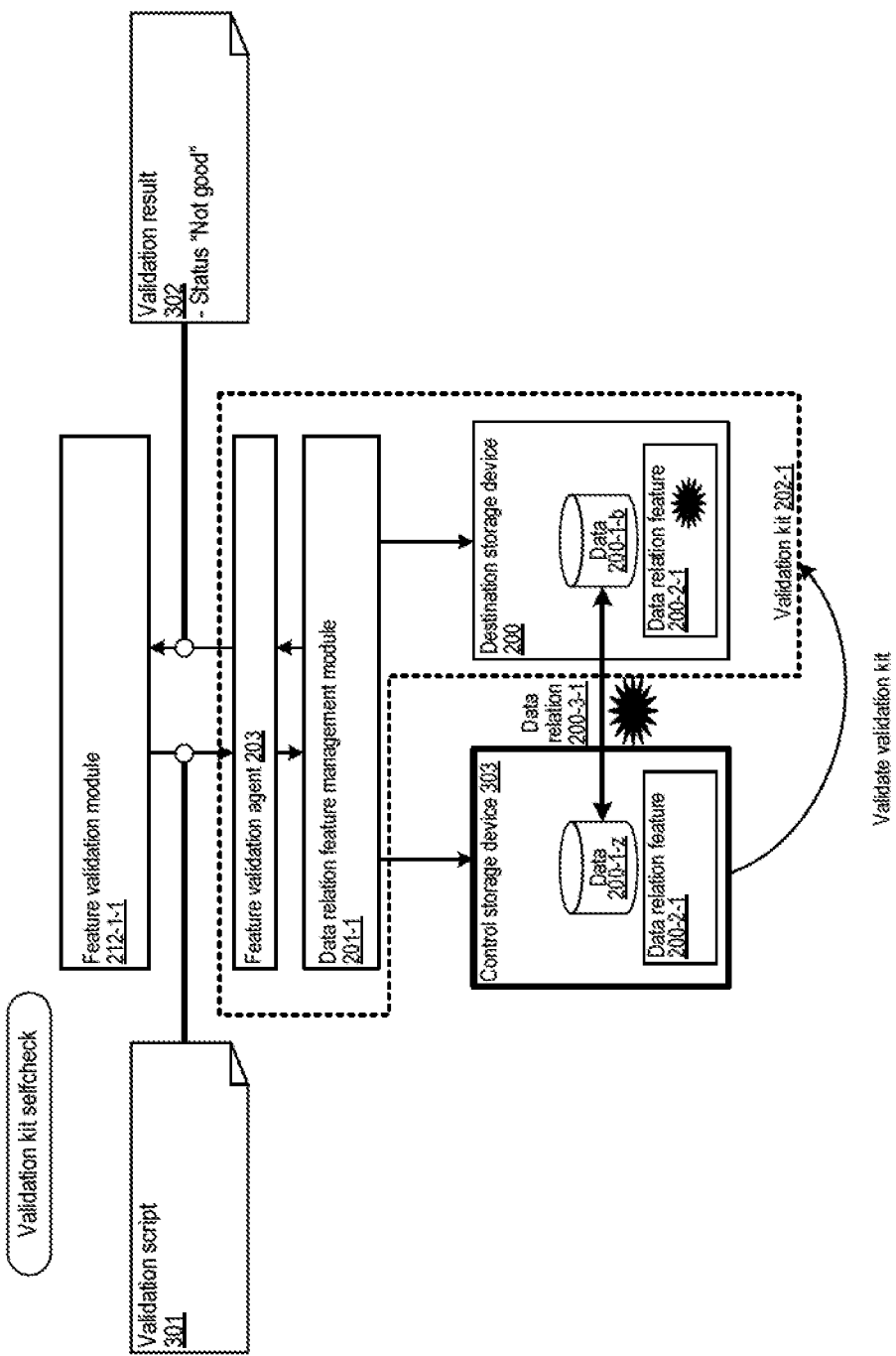
FIG. 4 illustrates the setup of the feature kit selfcheck, in accordance with an example implementation.

Validation kit selfcheck is another main function of the storage configuration system. The purpose of the process is to check the status of the validation kit to be used in the above feature validation process. FIG. 4 illustrates the setup of the feature kit selfcheck, in accordance with an example implementation. Most of the setup of the process is the same as feature validation, but instead of target storage device, control storage device 303 is used for the data relation creation. Control storage device 303 is a safe storage device which can create a dummy data relation with the validation kit. Validation kit selfcheck is done by data relation creation with control storage device 303 and validation kit. If the data relation creation is successful, it means that the validation kit is healthy and good to be used as the validation kit. If the data relation creation fails, it means that some components of the validation kit would become erroneous. For example, validation kit could be affected by a temporary network shutdown or some configuration drift such as a change to the IP address.

This validation kit selfcheck can be done at the same time with the feature validation process or it can be done at a different timing, depending on the desired implementation. The validation kit selfcheck can be done at regular intervals such as one day or one week if the operator sets up the configuration accordingly.

Database

FIG. 5 to FIG. 11 illustrate the various contents inside database 211, in accordance with an example implementation.

FIG. 5 illustrates the storage class device list 211-1, in accordance with an example implementation. Storage class device list is information storing the mapping of the storage class and the storage device names which are used in storage classification process. Storage class column is for the names of the storage classes. Storage device names 211-1-2 is for the names of the storage devices.

In the example of FIG. 5, the table shows that storage class named StorageClass1 has four storage devices Sb, Sc, Sd, Se.

FIG. 6 illustrates the storage class—feature table 211-2. This table stores mapping of storage class to required features and validation kit name. Storage class column 211-2-1 stores names of each storage class. Required feature type 211-2-2 and feature subtype 211-2-3 is feature names which are required for the storage class. Feature subtype 211-2-3 is optional column which defines subcategories included in a feature. Feature validation kit name 212-2-4 stores names of validation kits to validate features required for the storage class.

In the example of FIG. 6, the table shows that a storage class named "StorageClass1" requires all storage devices to support a feature "backup" and subtypes "BackupWithS3" and "BackupWithAzureBlob". These subtypes are tied with feature validation kit "BackupKit1" and "BackupKit2". This means that feature validation for "StorageClass1" will be done by "BackupKit1" and "BackupKit2".

FIG. 7 illustrates the feature validation kit table 211-3, in accordance with an example implementation. Feature validation kit table stores detailed information of each validation kit to manage various validation kits. Feature validation kit name 211-3-1 is a name for each validation kit. API address 211-3-2 is an IP address used when feature validation module communicates with the validation kit during feature validation process. In particular, the Application Programming Interface (API) address may be an IP address of feature validation agent 203 which is described in FIG. 3. Control storage device column 211-3-3 is the names of storage device candidates which are used in the validation kit selfcheck process. Validation kit status column 211-3-4 stores a status flag which shows if the validation kit is in a good state or not.

In the example of FIG. 6, the table shows that feature validation kit "BackupKit1" has API address "X.X.X.X" and control storage device "Sb". Also, it is shown that "BackupKit1" is in good status.

FIG. 8 illustrates the feature validation script table 211-4, in accordance with an example implementation. Feature validation script table stores the mapping from the feature type to the feature validation script. Feature type/subtype column 211-4-1 corresponds with the required feature type 211-2-2 and feature subtype 211-2-3 in FIG. 6, which specifies these kind of feature to be validated. Feature validation script 211-4-2 stores the label of the validation script which corresponds to validation script 301 in FIG. 3.

FIG. 9 illustrates storage device list 211-5, in accordance with an example implementation. Storage device list stores information of each of the storage devices such as names, parameters, supporting features, and validation results. Storage device 211-5-1 stores the names of each storage device. Parameters 211-5-2 stores other basic information of the storage devices such as IP address. Feature validation result 211-5-4 stores the latest validation result which corresponds to validation result 302 in FIG. 3. Feature validation result 211-5-4 can involve the status 211-5-4-1, throughput 211-5-4-2, and lag time 211-5-4-3. Latest validation time 211-5-5 is the timestamp when the feature validation result 211-5-4 is retrieved.

FIG. 10 illustrates feature status decision table 211-6, in accordance with an example implementation. Feature status decision table stores decision rules regarding how to create outputs in response to inputs in the feature validation process. Output type 211-6-1 is a field to show what kind of output is created by the decision rule. Input patterns 211-6-2 is a list of patterns 211-6-2-1, 211-6-2-2, 211-6-2-3, 211-6-2-4 which target the storage device and the control storage device returns as the status in their validation results. For example, pattern 1 211-6-2-1 in input pattern 211-6-2 shows a pattern in which a validation result of target storage device is "good" status and a validation result of control storage device is "good" also. In this case, the feature validation process will create a feature validation result as "good" and validation kit status as "good". In another pattern #2 211-6-2-2, both statuses of validation results are "Not good". In this case, it means that the used validation kit has some issue and is not working correctly. Therefore, the output of validation kit status is "Not good". Due to the same reason, the target storage device cannot be judged by an erroneous validation kit. Therefore, the output of feature validation result will be "Pending", which means that the feature validation process needs another trial to judge features of the target storage device and keeps the result pending until the trial.

FIG. 11 illustrates the feature validation result history table 211-7, in accordance with an example implementation. Feature validation result history table stores a history list of results which the feature validation process generates. The table can have the same fields as feature status decision table 211-6, such as name of storage device 211-7-1, feature validation kid 211-7-2, validation kit result 211-7-3, and latest validation time 211-7-4.

In the example of FIG. 11, a storage device named Sa has been checked by feature validation kit BackupKit1 and its result says status as "Good", throughput as 350 MB/s and lag time as 10s. The throughput and the lag time are optional metrics which the feature validation script can generate. Some history may have such optional metrics and others may not have such metrics. This record is created at a timestamp 2023/02/01 19:53:12 shown in latest validation time.

Flow of Feature Validation Process and Validation Kit Selfcheck Process

Figure 12:
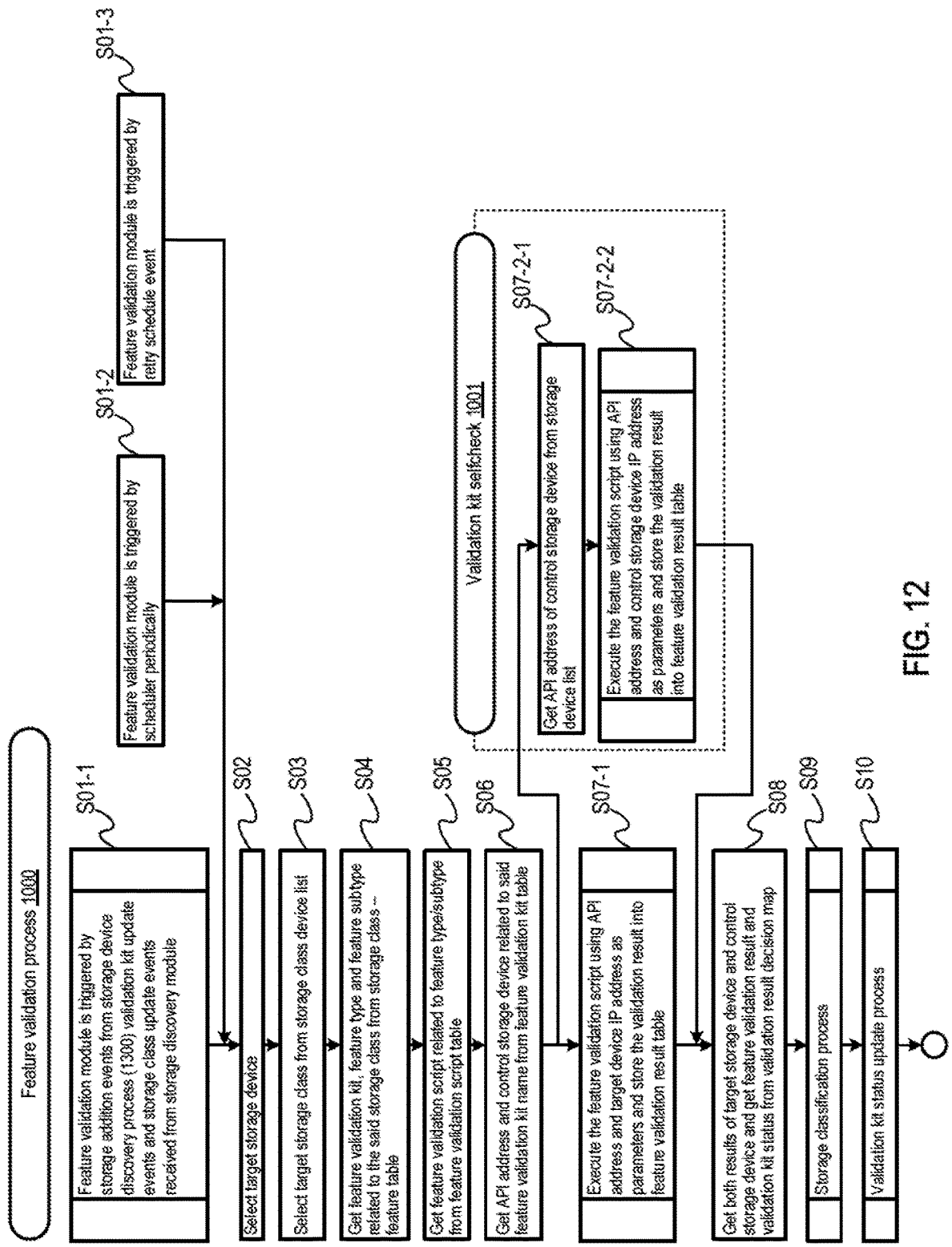
FIG. 12 illustrates the feature validation process, in accordance with an example implementation.

FIG. 12 illustrates an example flow of feature validation process 1000 and validation kit selfcheck process 1001, in accordance with an example implementation. In this example, validation kit selfcheck process 1001 is executed as a part of feature validation process 1000. Feature validation process 1000 is executed by feature validation module 212-1 as described in the "Feature validation" section herein.

S1201-1-S1201-3: Feature validation module 212-1 is triggered by many kinds of events (S01-1). One possibility is storage addition events from storage device discovery module 212-2. Another is validation kit update events from external component discovery module 212-1-3. Another is storage class update events from storage device discovery module 212-1-2. In another case, feature validation module is triggered by a scheduler periodically (S01-2). This happens when the operator needs to check features of the storage devices and validation kits periodically and the operator configures the system accordingly. In another case, feature validation module is triggered by retry schedule event (S01-3). This happens after some validation kit fails in feature validation process.

S1202: Feature validation module 212-1 selects target storage device according to storage addition requests or other events. For example, the module selects storage device named "Sa".

S1203: Feature validation module 212-1 selects target storage class from storage class device list. For example, storage class named "StorageClass1" is selected from FIG. 5. In FIG. 5 example, StorageClass1 does not contain storage device "Sa" yet.

S1204: Feature validation module 212-1 gets feature validation kit, feature type and feature subtype related to storage class—feature table. For "StorageClass1", this step gets "Backup" as feature type, two subtypes of "BackupWithS3" and "BackupWithAzureBlob", and two validation kits of "BackupKit1" and "BackupKit2" from FIG. 6.

S1205: Feature validation module 212-1 gets the feature validation script related to the feature type and subtype. For feature type "Backup" and subtypes of both "BackupWithS3" and "BackupWithAzureBlob", this step gets validation scripts of "BackupValidationScript1" and "BackupValidationScript2" from FIG. 8.

S1206: Feature validation module 212-1 gets API addresses and control storage devices related to the feature validation kit. For validation kit "BackupKit1", this step gets API address "X.X.X.X" and control storage device "Sb". This means that control storage device "Sb" is used for selfcheck of validation kit BackupKit1 because the device is already validated and classified as a member of StorageClass1 according to FIG. 5. Sometimes, control storage device would be "Any", which means that any storage device in the same storage class can be used for the same purpose and the process can pick up one device in any manner such as round-robin or random selection.

S1207-1: Feature validation module 212-1 remotely commands execution of feature validation script toward API address of validation kit, where feature validation agent 203 runs. The remote execution request includes parameters required for script execution such as target storage device IP address. For an example of validation kit "BackupKit1" and validation script "BackupValidationScript1" is sent to "X.X.X.X" which is API address of "BackupKit1" and at the same time, parameters of IP address "Y.Y.Y.Y" is sent. With using the script and parameters, the feature validation agent executes the validation script and get a result such like "Status: good, throughput: 350 MB/s, lag time: 10 s" from the script. The detail of this step is described in FIG. 13.

S1207-2-1-S1207-2-2: These steps represent validation kit selfcheck process 1001. Feature validation module 212-1 remotely commands execution of feature validation script toward the validation kit. This time, parameters are not for target storage device but for control storage device.

S1208: Feature validation module 212-1 gets both results from S07-1 and S07-2-2 which represents both target storage device and control storage device. Feature validation module takes them as decision rule input and searches the validation result decision map. When the target storage device and control storage device returns the result "Status: good", it matches with pattern 1 in feature status decision table 211-6. Therefore, this step gets outputs of feature validation result "Good" and validation kit status "Good".

S1209: Storage classification process is called. In the process, feature validation result "good" which was generated by step S08 is used as an input. If the features required for storage class "StorageClass1", validated target storage device "Sa" will be a member of "StorageClass1". The detail of the step is described in FIGS. 14 and 15.

S1210: Validation kit status update process is called. In the process, validation kit status "good" which was generated by step S08 is used as an input.

In the last two steps S1209 and S1210, the feature validation module updates storage classification table and feature validation kit table. After these updates, the target storage device "Sa" is categorized into storage class "StorageClass1" which guarantees that the feature "BackupWithS3" correctly works.

Figure 13:
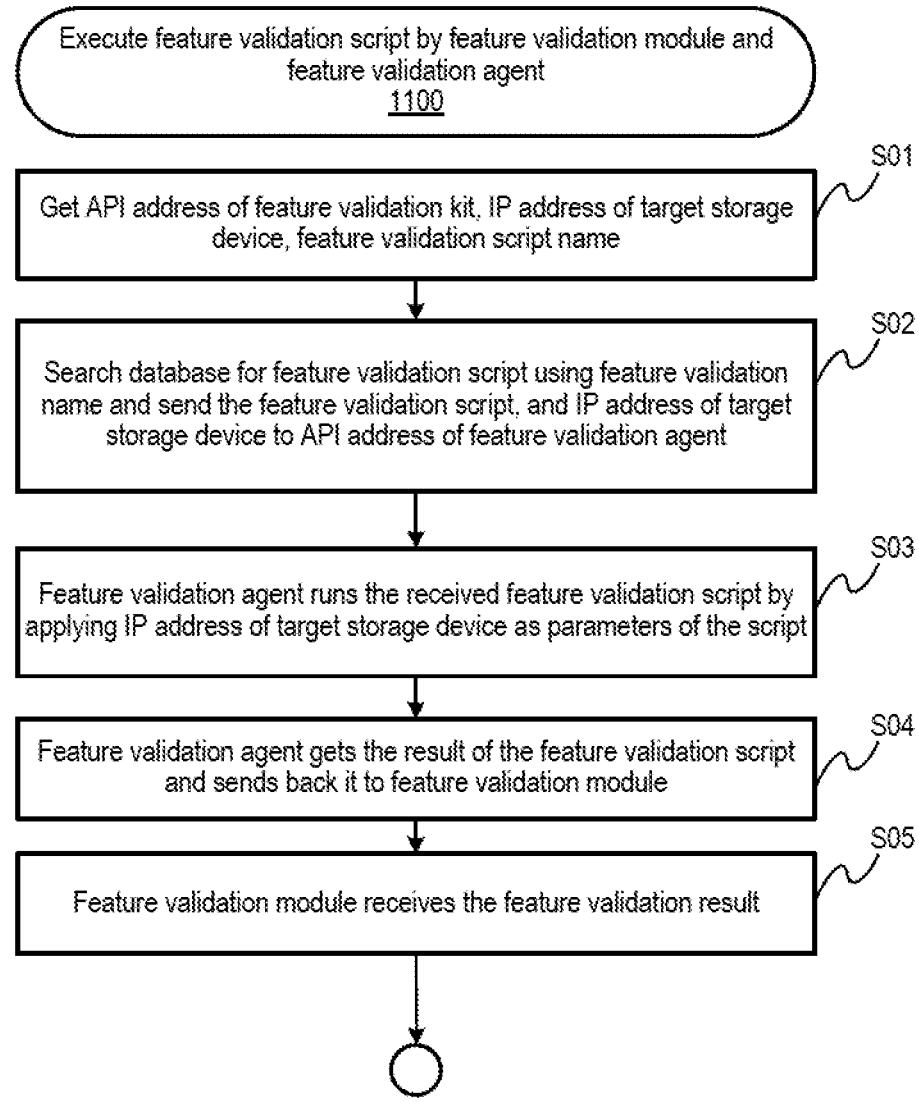
FIG. 13 illustrates the feature validation script execution, in accordance with an example implementation.

FIG. 13 illustrates a process flow of feature validation script execution 1100 which is called in feature validation process shown in FIG. 12, in accordance with an example implementation.

S1301: Feature validation module 212-1 gets API address of feature validation kit, IP address of target storage device from the step S1207-1 or S1207-2-2.

S1302: Feature validation module 212-1 searches the database for feature validation script such as feature validation script name "BackupValidationScript1". This script file is sent to API address of feature validation agent.

S1303: Feature validation agent 203 runs the received feature validation script by applying API address of the target storage device as parameters of the script.

S1304: Feature validation agent obtains the result of the feature validation script and sends it back to the feature validation module.

S1305: Feature validation module receives the feature validation result.

FIG. 14 illustrates an example of feature validation script, in accordance with an example implementation. The script has a unique name which can be identified by feature validation script table. The script is run by feature validation agent 203. During execution, parameters such as {IP address} are substituted by target storage device IP address as received by the feature validation agent. Other parameters such as (volume name) will be generated randomly because the volume will be temporarily created for the validation purpose. The last step of the script gets the validation result as "Good" or "Not good".

Storage Classification Process

Figure 15:
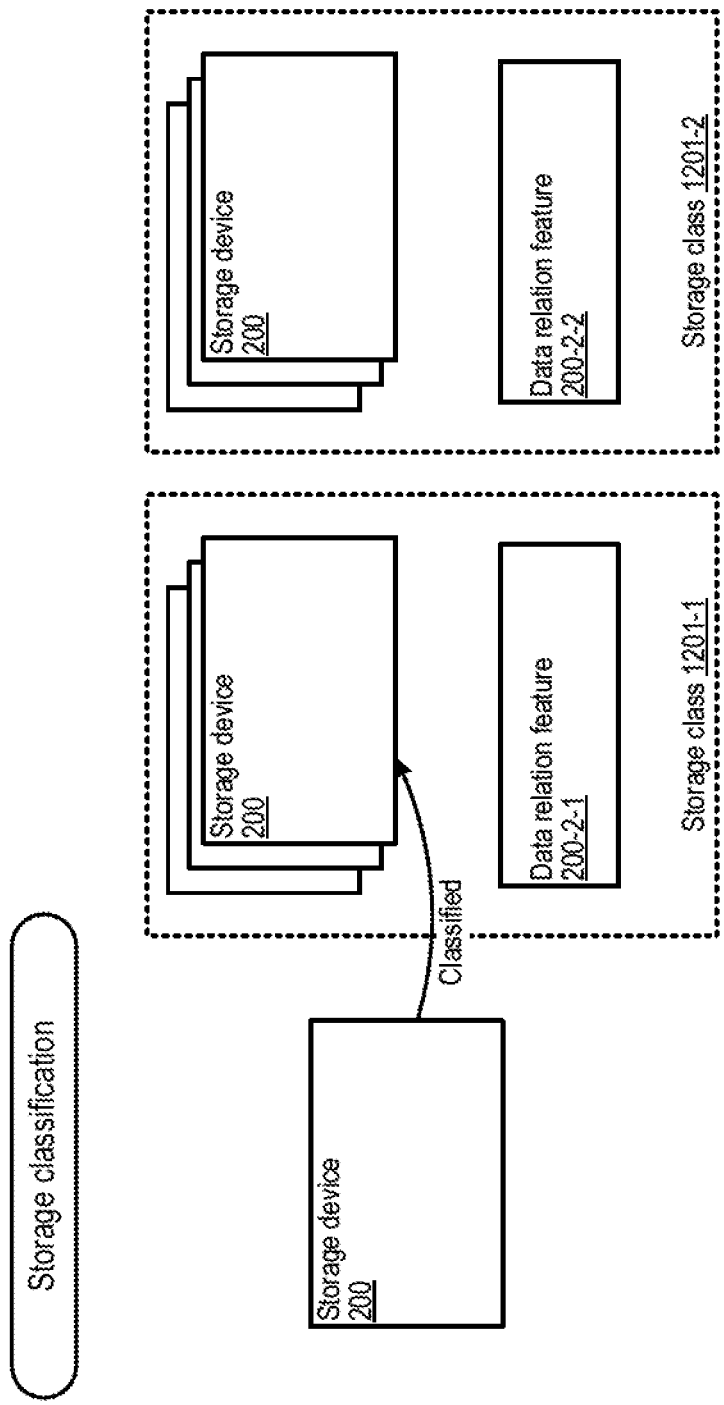
FIG. 15 illustrates the storage classification process overview, in accordance with an example implementation.

FIG. 15 illustrates an overview of the storage classification process, in accordance with an example implementation. Storage classification process is called in feature validation process and it uses the result of validation script and decision table. If the result of feature validation is "Good", it ensures that the storage device has the feature required for storage class. Once it is ensued, storage classification module 212-1-4 registers the target storage device as a member of the storage class. After this registration, the registered storage device is used for user's request which is described in FIG. 21.

Figure 16:
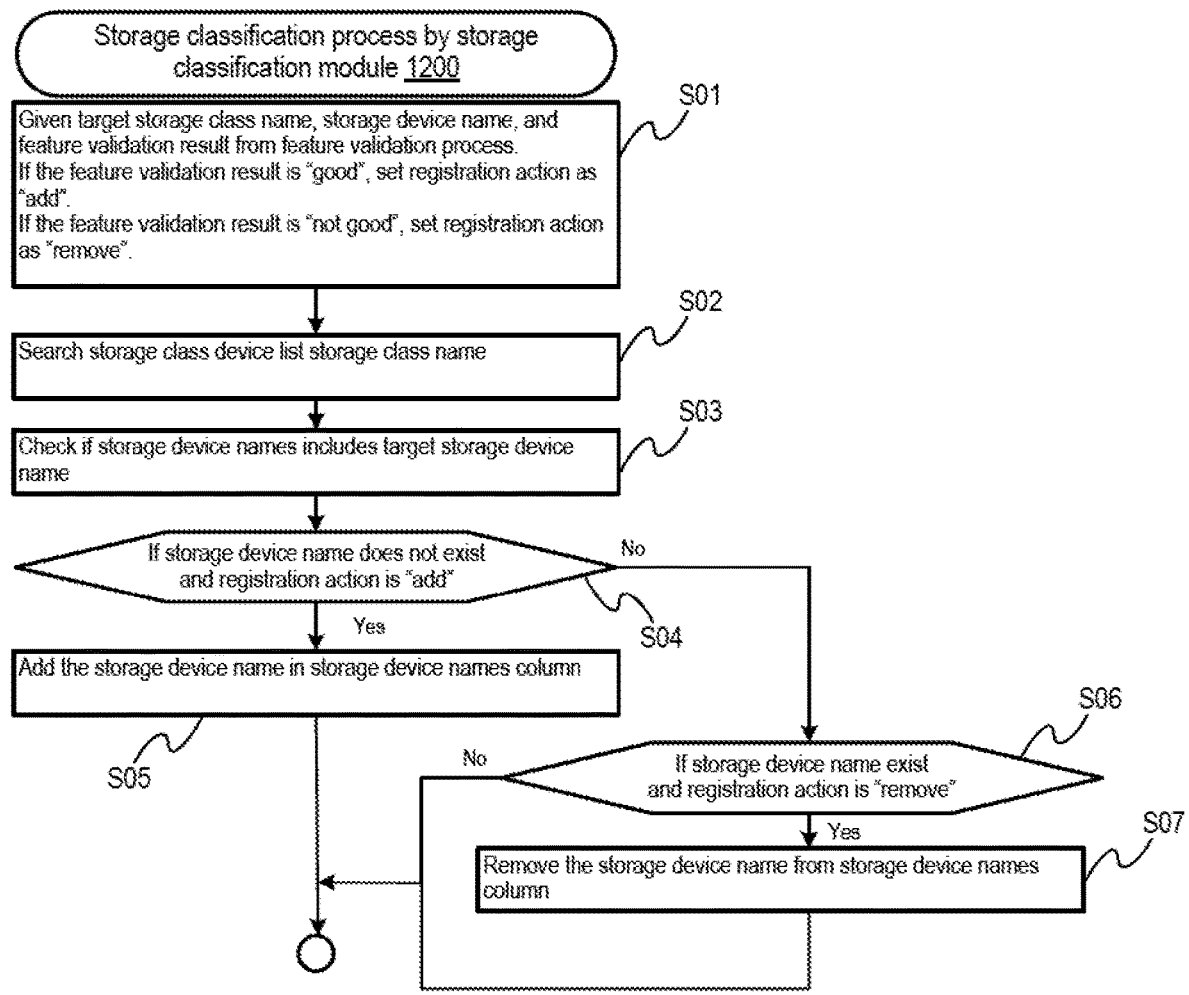
FIG. 16 illustrates the storage classification process flow, in accordance with an example implementation.

FIG. 16 illustrates an example flow of storage classification process 1200, in accordance with an example implementation.

S1601: if feature validation result is "good", storage classification module 212-1-4 sets registration action as "add". If the result is "not good", storage classification module sets registration action as "remove". These mean that the subsequent steps work as an addition of a member or a removal of a member.

S1602: Storage classification module 212-1-4 searches storage class device list for storage class name such as "StorageClass1".

S1603: Storage classification module 212-1-4 check if storage device name "Sa" is included in the storage class device list.

S1604: If storage device "Sa" is not in storage class device list, and if registration action is "add", then the process goes to step S1605. If not, the process goes to S1606.

S1605 (addition of storage device): Storage classification module 212-1-4 adds the storage device "Sa" into a row of storage class device list which corresponds to "StorageClass1". It is originally "Sb, Sc, Sd, Se". After the addition, it will be updated to "Sa, Sb, Sc, Sd, Se".

S1606: If storage device "Sa" is in storage class device list, and if registration action is "remove", then the process goes to step S1607. If not, the process goes to the end step.

S1607 (removal of storage device): Storage classification module 212-1-4 removes the storage device "Sa" from a row of storage class device list. If it is originally "Sa, Sb, Sc, Sd, Se", after the addition, it will be updated to "Sb, Sc, Sd, Se".

Figure 17:
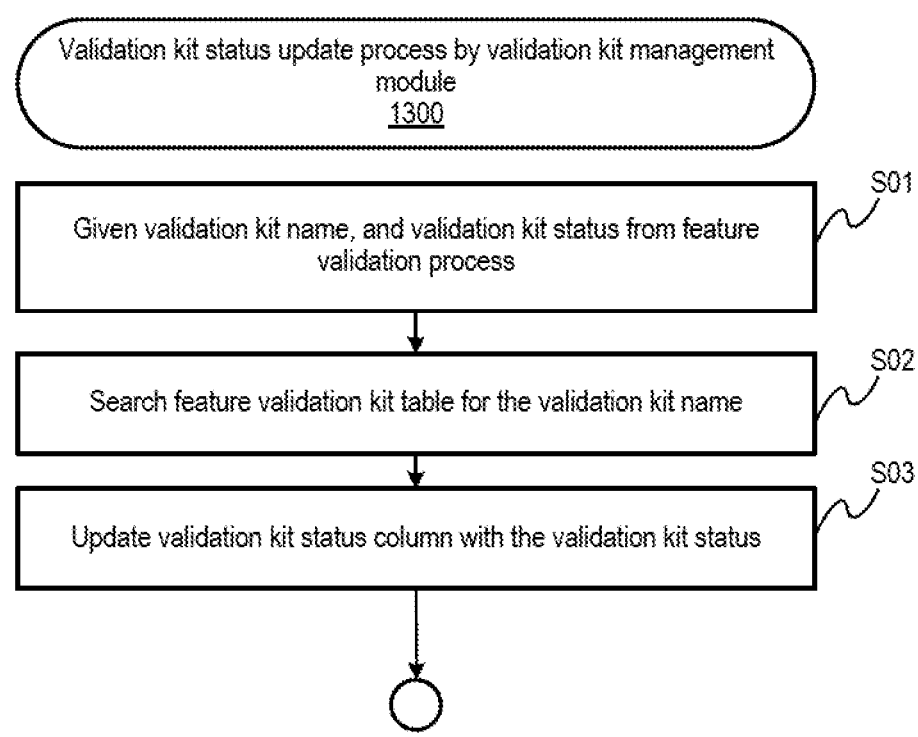
FIG. 17 illustrates the validation kit status update process flow, in accordance with an example implementation.

FIG. 17 illustrates a validation kit status update process flow, in accordance with an example implementation. The validation kit status update process is called by the feature validation process. The update process is executed by validation kit management module 212-1-5.

S1701: The validation kit management module receives the validation kit name and validation kit status from the feature validation process.

S1702: The validation kit management module searches the feature validation kit table for the validation kit name.

S1703: The validation kit management module updates the validation kit status column with the validation kit status.

Figure 18:
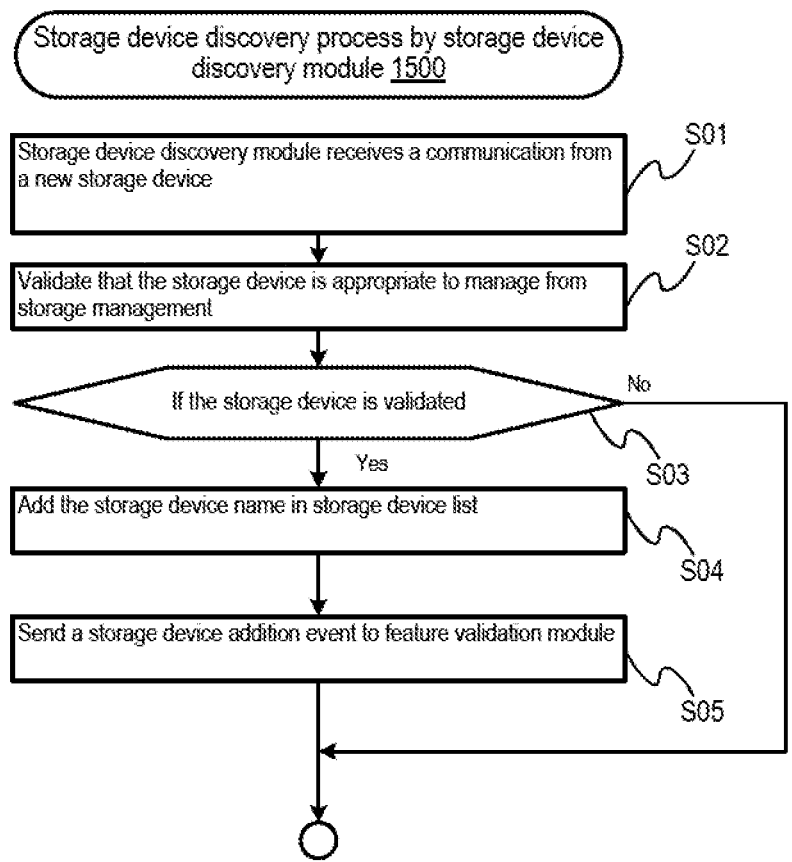
FIG. 18 illustrates the storage device discovery process flow, in accordance with an example implementation.

FIG. 18 illustrates the storage device discovery process flow, in accordance with an example implementation. The storage device discovery process is executed by storage device discovery module 212-1-2. When a new storage device is added to network 206, storage device discovery module 212-1-2 catches the event, manages database accordingly and send a storage device addition event to feature validation module to trigger the feature validation process.

S1801: Storage device discovery module 212-1-2 receives a communication from a new storage device. This step can be triggered by storage device. For example, a storage device is turned on and connected to network 206. The storage device may have some automatic initialization process which automatically starts communications and sends the device name to storage configuration system.

S1802: Storage device discovery module 212-1-2 validates that the storage device is appropriate to manage from storage management system.

S1803: If the storage device is validated, then the process goes to step S1804. If not, the process ends.

S1804: Storage device discovery module adds the storage device name in storage device list.

S1805: Storage device discovery module sends a storage device addition event which includes storage device name to feature validation module.

Figure 19:
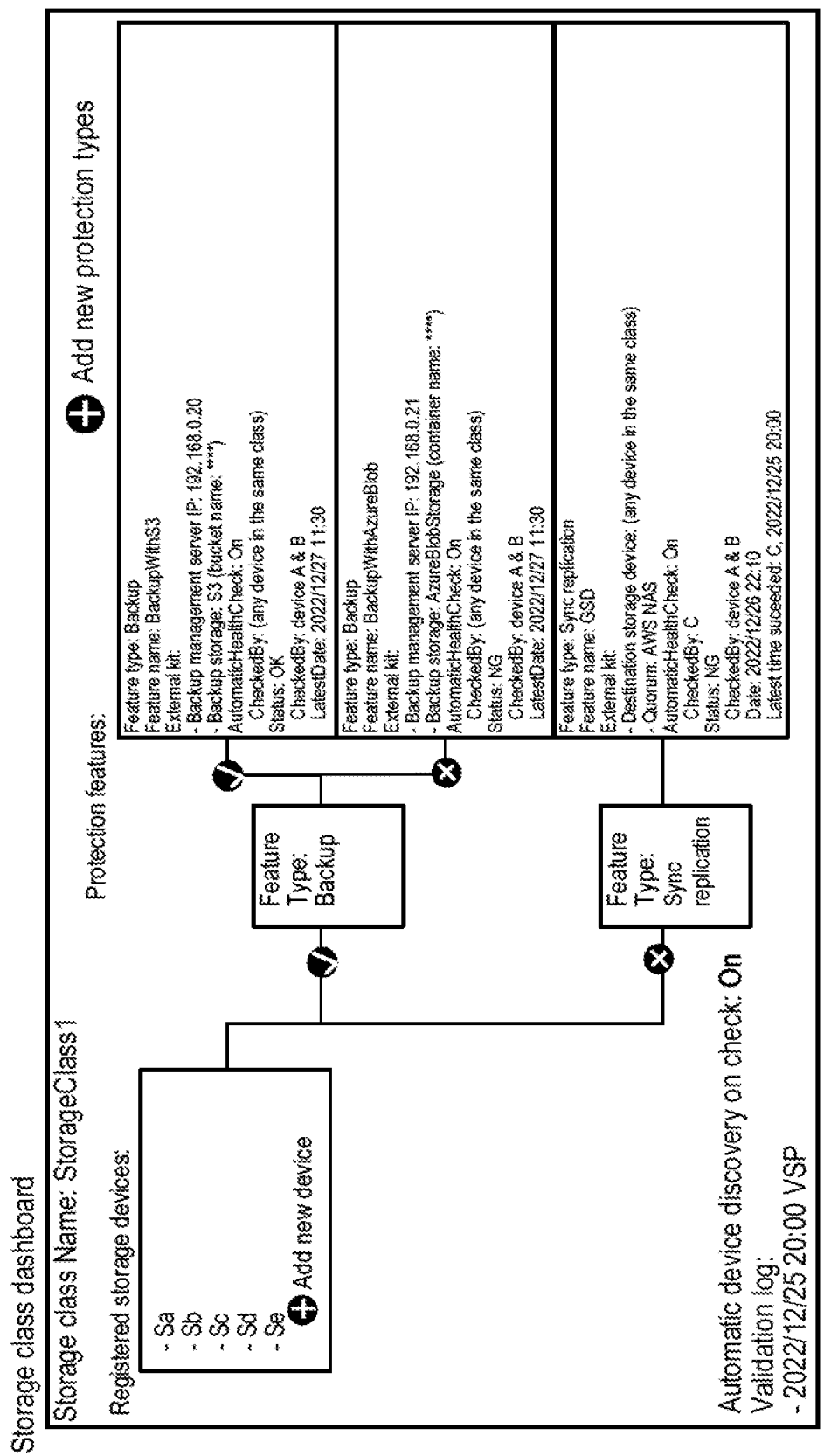
FIG. 19 illustrates the storage class dashboard example 1, in accordance with an example implementation.

FIG. 19 illustrates one of storage class dashboard examples, in accordance with an example implementation. Storage class dashboard 213-1 is used by operator 214. Storage class dashboard provides a current summary view of storage classes and validation kits. The summary includes the information of what storage devices are validated as member of storage class and which validation kit is used for the validation.

Most of the information in the dashboard comes from database 211. For example, a view of a storage class includes "storage class name" and "registered storage devices" which are corresponding to storage class device list 211-1 contents. FIG. 19 shows that a storage class named "StorageClass1" has members of storage devices "Sa", "Sb", "Sc", "Sd" and "Se". This view also shows relationship between a storage class with one or more features. FIG. 19 shows that "StorageClass1" has a relationship with two features: "Backup" and "SyncReplication". These features are subsequently related to feature subtypes. The feature "Backup" is related to feature subtypes of "BackupWithS3" and "BackupWithAzureBlob". For each feature type/subtype, feature profile and related validation kit are shown. For example, "BackupWithS3" feature subtype contains an external kit (validation kit) which has backup management server IP address "192.168.0.20" and backup storage "S3". The feature profile also has an automatic health check field. If the field is on, the storage configuration system uses the validation kit automatically.

Another field is validation kit status. The validation kit which is used in feature validation is monitored and shown in status view as "OK" or "NG" which are corresponding to validation kit status 211-3-4. If operator 214 sees the status is "NG", the operator can know that some remediation is needed for recovery of validation kit status. This status also shows the latest timestamp 211-3-4 when the validation kit status is checked, and the latest device which validation kit is used with.

Further, the feature validation kit status can be shown as icon "check mark" or "cross". Status of some feature type "Backup" can be calculated by feature subtype's statuses. "Backup" status is calculated as "OK" as both statuses of subtypes "BackupWithS3" and "BackupWithAzureBlob" are "OK" and "NG", and OR operation of these statuses results in "OK".

Figure 20:
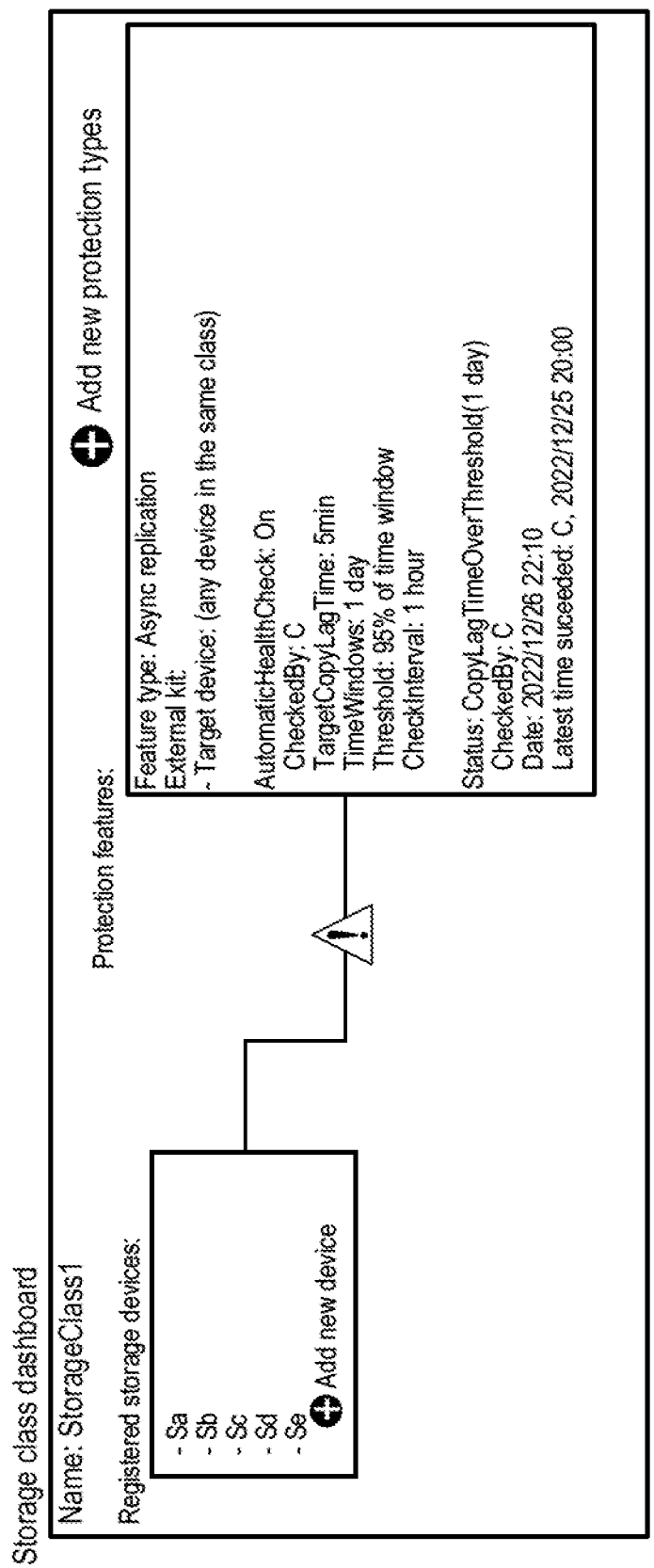
FIG. 20 illustrates the storage class dashboard example 2, in accordance with an example implementation.

FIG. 20 illustrates another example of storage class dashboard, in accordance with an example implementation. This is the case in which feature validation kit has some additional status information. In this case, the validation kit is for validating asynchronous replication and the status is labeled as "CopyLagTimeOverThreshold" which means that the lag time measured by validation kit is over the threshold configuration. The threshold is set to five minutes and the check interval is set to one hour. In this setup, feature validation process is triggered by scheduler periodically at an one hour interval (shown in FIG. 12, S1201-2). The validation results include lag time 211-5-5. Then, if the lag time is over five minutes, the feature validation process outputs the validation kit status as "CopyLagTimeOverThreshold". It means that some issue in the network or computing devices caused an increase of lag time. Once operator 214 is notified of this lag time issue, the operator can remedy the issue by analyzing network or computing devices.

FIG. 21 illustrates an example of user data request program user interface, in accordance with an example implementation. User 216 can request data provisioning from this user interface. The storage configuration system can respond to the request with allocating the user data location inside the registered storage device. In this user interface, user can specify the name of new data, the storage class which user's data will be located, and the required size of the data. After this user request, User 216 can remotely turn on or off the feature such as replication/remote backup on the user data management if needed.

As a summary, in the storage configuration system implementation, the core concepts "feature validation process" and "validation kit selfcheck process" works as an automated validation of features. The information used for the concepts are in database. The storage device classification process maintains storage classes which satisfies user's request for features.

Using the disclosed system implementation, user requests of features regarding data protection is satisfied by feature validation of storage devices prior to the request. Additionally, storage devices are automatically classified by the feature validation result. User requests through the data request program specifies storage class which are tied with validated features. Therefore, it is guaranteed that the remote backup/replication feature works correctly for the data. Users can use the correct storage devices which supports the user requests of required features.

Through the example implementations described herein, operators can manage external components as reusable groups named "validation kits".

Moreover, operators can register external components in a different lifecycle from the storage device thanks to separate modules of the validation kit management module and the storage device discovery module.

Figure 22:
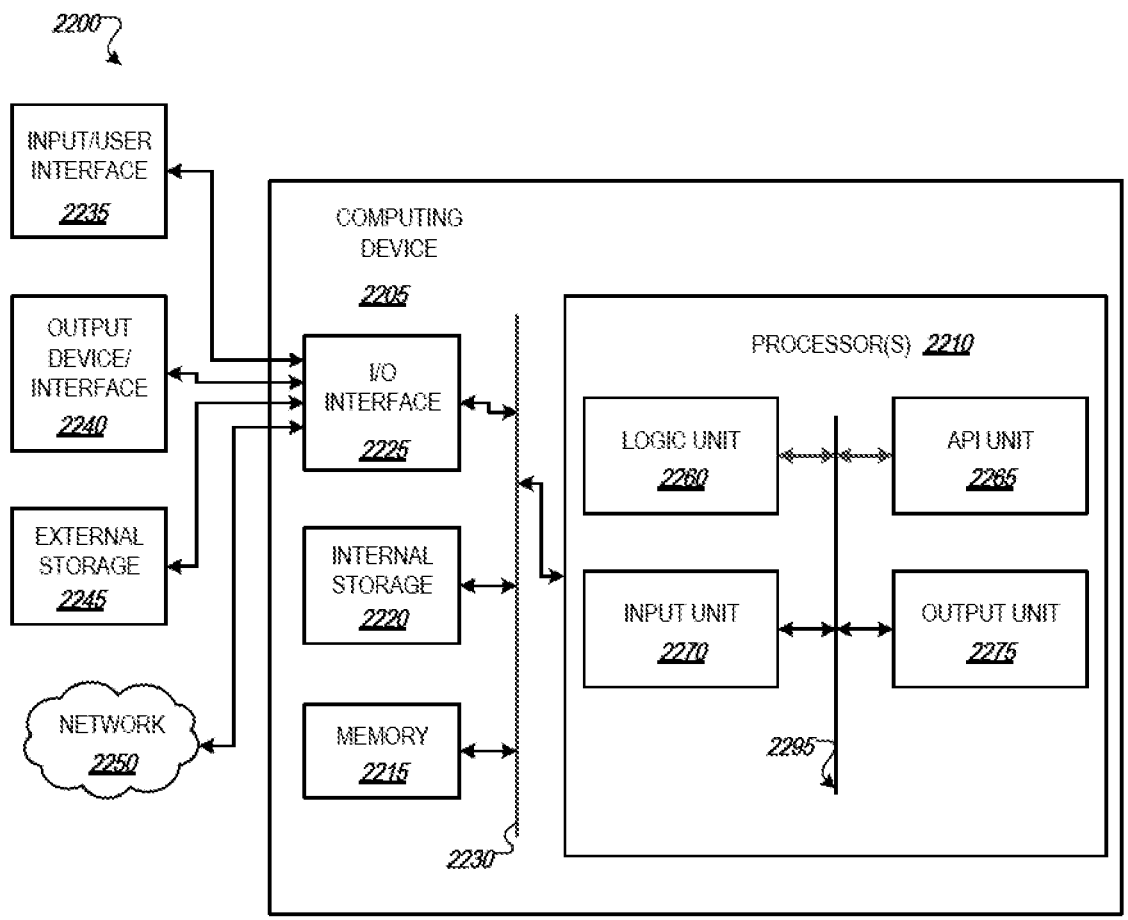
FIG. 22 illustrates an example computing environment with an example computer device suitable for use in some example implementations.

FIG. 22 illustrates an example computing environment with an example computer device suitable for use in some example implementations. Computer device 2205 in computing environment 2200 can include one or more processing units, cores, or processors 2210, memory 2215 (e.g., RAM, ROM, and/or the like), internal storage 2220 (e.g., magnetic, optical, solid state storage, and/or organic), and/or I/O interface 2225, any of which can be coupled on a communication mechanism or bus 2230 for communicating information or embedded in the computer device 2205. I/O interface 2225 is also configured to receive images from cameras or provide images to projectors or displays, depending on the desired implementation.

Computer device 2205 can be communicatively coupled to input/user interface 2235 and output device/interface 2240. Either one or both input/user interface 2235 and output device/interface 2240 can be a wired or wireless interface and can be detachable. Input/user interface 2235 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 2240 may include a display, television, monitor, printer, speaker, braille, or the like. In some example implementations, input/user interface 2235 and output device/interface 2240 can be embedded with or physically coupled to the computer device 2205. In other example implementations, other computer devices may function as or provide the functions of input/user interface 2235 and output device/interface 2240 for a computer device 2205.

Examples of computer device 2205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 2205 can be communicatively coupled (e.g., via I/O interface 2225) to external storage 2245 and network 2250 for communicating with any number of networked components, devices, and systems, including one or more computer devices of the same or different configurations. Computer device 2205 or any connected computer device can be functioning as, providing services of or referred to as a server, client, thin server, general machine, special-purpose machine, or another label.

I/O interface 2225 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 2200. Network 2250 can be any network or combination of networks (e.g., the Internet, local area network, wide area network, a telephonic network, a cellular network, satellite network, and the like).

Computer device 2205 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 2205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 2210 can execute under any operating system (OS) (not shown), in a native or virtual environment. One or more applications can be deployed that include logic unit 2260, application programming interface (API) unit 2265, input unit 2270, output unit 2275, and inter-unit communication mechanism 2295 for the different units to communicate with each other, with the OS, and with other applications (not shown). The described units and elements can be varied in design, function, configuration, or implementation and are not limited to the descriptions provided. Processor(s) 2210 can be in the form of hardware processors such as central processing units (CPUs) or in a combination of hardware and software units.

In some example implementations, when information or an execution instruction is received by API unit 2265, it may be communicated to one or more other units (e.g., logic unit 2260, input unit 2270, output unit 2275). In some instances, logic unit 2260 may be configured to control the information flow among the units and direct the services provided by API unit 2265, input unit 2270, output unit 2275, in some example implementations described above. For example, the flow of one or more processes or implementations may be controlled by logic unit 2260 alone or in conjunction with API unit 2265. The input unit 2270 may be configured to obtain input for the calculations described in the example implementations, and the output unit 2275 may be configured to provide output based on the calculations described in the example implementations.

Processor(s) 2210 can be configured to execute a method or instructions, which can involve, for receipt of an addition or modification of a storage device, executing a validation process from one or more managed validation kits according to a remote copy function associated with the storage device, the one or more managed validation kits selected according to one or more feature types associated with the remote copy function; associating the storage device with a corresponding group of storage devices associated with the remote copy function based on information provided by the one or more managed validation kits; and for the association of the storage device with the corresponding group of storage devices and the execution of the validation process being successful, registering the storage device to a storage class associated with the remote copy function.

Processor(s) 2210 can be configured to execute the method or instructions as described herein, and further involve executing an automatic health check of the one or more validation kits, the executing including creating data relations between the one or more validation kits and a control storage device configured to receive dummy data relations; for the creating of the data relations between the one or more validation kits and the control storage device being successful, returning a healthy status for the health check.

Processor(s) 2210 can be configured to execute the method or instructions as described herein, and further involve returning a status for each of the one or more validation kits based on referencing a status decision table configured to output the status based on a first result of a health check of the one or more validation kits with a control storage device and a second result of the association of the storage device with the corresponding group of storage devices.

Processor(s) 2210 can be configured to execute the method or instructions as described herein, and further involve, for the association of the storage device with the corresponding group of storage devices and the execution of the validation process returning a status of temporary failure, automatically re-executing the validation process and reassociating the storage device with the corresponding group after a period of time.

Processor(s) 2210 can be configured to execute the method or instructions as described herein, and further involve, for a usage of the corresponding group of storage devices associated with the remote copy function exceeding a threshold, registering the associated storage device to the group of storage devices; and making the associated storage device available for the remote copy function.

Processor(s) 2210 can be configured to execute the method or instructions as described herein, and further involve, for the validation process being directed to replication, creating a path between the storage device to another storage device; and creating a volume pair between the storage device and the another storage device; and monitoring a status of the volume pair.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   for receipt of an addition or modification of a storage device:
   executing a validation process from one or more managed validation kits according to a remote copy function associated with the storage device, the one or more managed validation kits selected according to one or more feature types associated with the remote copy function;
   associating the storage device with a corresponding group of storage devices associated with the remote copy function based on information provided by the one or more managed validation kits; and
   for the association of the storage device with the corresponding group of storage devices and the execution of the validation process being successful, registering the storage device to a storage class associated with the remote copy function.

2. The method of claim 1, further comprising executing an automatic health check of the one or more validation kits, the executing comprising:
   creating data relations between the one or more validation kits and a control storage device configured to receive dummy data relations;
   for the creating of the data relations between the one or more validation kits and the control storage device being successful, returning a healthy status for the health check.

3. The method of claim 1, further comprising returning a status for each of the one or more validation kits based on referencing a status decision table configured to output the status based on a first result of a health check of the one or more validation kits with a control storage device and a second result of the association of the storage device with the corresponding group of storage devices.

4. The method of claim 1, further comprising, for the association of the storage device with the corresponding group of storage devices and the execution of the validation process returning a status of temporary failure, automatically re-executing the validation process and reassociating the storage device with the corresponding group after a period of time.

5. The method of claim 1, further comprising, for a usage of the corresponding group of storage devices associated with the remote copy function exceeding a threshold:
   registering the associated storage device to the group of storage devices; and
   making the associated storage device available for the remote copy function.

6. The method of claim 1, further comprising, for the validation process being directed to replication:
   creating a path between the storage device to another storage device; and
   creating a volume pair between the storage device and the another storage device;
   and monitoring a status of the volume pair.

7. A non-transitory computer readable medium, storing instructions for executing a process, the instructions comprising:
   for receipt of an addition or modification of a storage device:
   executing a validation process from one or more managed validation kits according to a remote copy function associated with the storage device, the one or more managed validation kits selected according to one or more feature types associated with the remote copy function;
   associating the storage device with a corresponding group of storage devices associated with the remote copy function based on information provided by the one or more managed validation kits; and
   for the association of the storage device with the corresponding group of storage devices and the execution of the validation process being successful, registering the storage device to a storage class associated with the remote copy function.

8. The non-transitory computer readable medium of claim 7, the instructions further comprising executing an automatic health check of the one or more validation kits, the executing comprising:
   creating data relations between the one or more validation kits and a control storage device configured to receive dummy data relations;

for the creating of the data relations between the one or more validation kits and the control storage device being successful, returning a healthy status for the health check.

9. The non-transitory computer readable medium of claim 7, the instructions further comprising returning a status for each of the one or more validation kits based on referencing a status decision table configured to output the status based on a first result of a health check of the one or more validation kits with a control storage device and a second result of the association of the storage device with the corresponding group of storage devices.

10. The non-transitory computer readable medium of claim 7, the instructions further comprising, for the association of the storage device with the corresponding group of storage devices and the execution of the validation process returning a status of temporary failure, automatically re-executing the validation process and reassociating the storage device with the corresponding group after a period of time.

11. The non-transitory computer readable medium of claim 7, the instructions further comprising, for a usage of the corresponding group of storage devices associated with the remote copy function exceeding a threshold:
  registering the associated storage device to the group of storage devices; and
  making the associated storage device available for the remote copy function.

12. The non-transitory computer readable medium of claim 7, the instructions further comprising, for the validation process being directed to replication:
  creating a path between the storage device to another storage device; and
  creating a volume pair between the storage device and the another storage device;
  and monitoring a status of the volume pair.

13. An apparatus, comprising:
  a processor, configured to, for receipt of an addition or modification of a storage device:
    executing a validation process from one or more managed validation kits according to a remote copy function associated with the storage device, the one or more managed validation kits selected according to one or more feature types associated with the remote copy function;
    associating the storage device with a corresponding group of storage devices associated with the remote copy function based on information provided by the one or more managed validation kits; and
    for the association of the storage device with the corresponding group of storage devices and the execution of the validation process being successful, registering the storage device to a storage class associated with the remote copy function.

14. The apparatus of claim 13, wherein the processor is further configured to execute an automatic health check of the one or more validation kits, by:
  creating data relations between the one or more validation kits and a control storage device configured to receive dummy data relations;
  for the creating of the data relations between the one or more validation kits and the control storage device being successful, returning a healthy status for the health check.

15. The apparatus of claim 13, wherein the processor is further configured to return a status for each of the one or more validation kits based on referencing a status decision table configured to output the status based on a first result of a health check of the one or more validation kits with a control storage device and a second result of the association of the storage device with the corresponding group of storage devices.

16. The apparatus of claim 13, wherein the processor is further configured to, for the association of the storage device with the corresponding group of storage devices and the execution of the validation process returning a status of temporary failure, automatically re-execute the validation process and reassociating the storage device with the corresponding group after a period of time.

17. The apparatus of claim 13, wherein the processor is further configured to, for a usage of the corresponding group of storage devices associated with the remote copy function exceeding a threshold:
  register the associated storage device to the group of storage devices; and
  making the associated storage device available for the remote copy function.

18. The apparatus of claim 13, wherein the processor is further configured to, for the validation process being directed to replication:
  create a path between the storage device to another storage device; and
  create a volume pair between the storage device and the another storage device;
  and monitor a status of the volume pair.

* * * * *